Patented June 7, 1927.

1,631,401

UNITED STATES PATENT OFFICE.

ROY CROSS, OF KANSAS CITY, MISSOURI, ASSIGNOR TO GASOLINE PRODUCTS COMPANY, INC., OF NEW YORK, N. Y., A CORPORATION OF NEW YORK.

PROCESS OF MAKING MOTOR FUEL.

No Drawing.   Application filed September 12, 1925.   Serial No. 56,070.

This invention relates to improvements in a process for making motor fuel having anti-detonating properties, and refers more particularly to a process for the production of a distillate having characteristics substantially that of commercial gasoline with decided anti-detonating properties.

The process concerns primarily a treatment of petroleum oils with liquid sulphur dioxide to extract therefrom the aromatic compounds and sulphur and subjecting the residue from the dissolved fractions to cracking conditions of temperature and pressure, said cracking conditions preferably being temperatures and pressures to convert the oil while the same is substantially in the liquid phase. There is recovered from this treatment a distillate which has pronounced anti-detonating properties and contains a considerable percentage of benzol and anti-detonating material. The process is particularly adapted to the treatment of California gasoline.

There has recently been adopted in a number of California refineries, particularly those interested in making a high grade lamp oil, a process known as the Edeleanu process. By this process there is recovered or extracted from California oils a high grade oil from California kerosene. When California kerosene is refined by ordinary processes it can not compete with Pennsylvania kerosene due to the presence of objectionable aromatics and sulphur. Briefly, the Edeleanu process consists essentially in the contacting of crude kerosene with liquid sulphur dioxide. This contacting may be effected at low temperature and pressure or at high temperature with sufficient pressure to maintain the liquid sulphur dioxide in the liquid condition. The liquid sulphur dioxide dissolves out the sulphur bearing compounds, naphthenes and aromatic compounds. The amount dissolved is often as high as 30% or 40%. The undissolved portion consists almost entirely of paraffin hydrocarbon practically nearly free from sulphur content. In the case of California kerosene, typical properties would be an oil having specific gravity of .832° or a Baumé gravity of 38.6°, an initial boiling point of 322° F. and an end point of approximately 594° F. The extracted portion or residue, after treatment with the sulphur dioxide, from such oil have a gravity of 26.9° Baumé, a specific gravity of .893°, an initial boiling point of 382° F. and an end point of 590° F. A second specimen of residue recovered after the extraction of California kerosene had a Baumé gravity of 29.8°, a specific gravity of .877°, an initial boiling point of 302° F. and an end point of 546° F.

When this extracted material which contains considerable amount of aromatic compounds and sulphur is subjected to a process of cracking in which the oil is subjected to temperature and pressure conditions controlled primarily for producing cracking while the oil is maintained substantially in the liquid phase, a product having the following characteristics was obtained:

Specific gravity .883.   Baumé gravity 20.7

| Per cent. | °F. temp. | Gravity of fraction. | Gravity of total over. | Gravity of stream. |
|---|---|---|---|---|
|   | 110 |   |   |   |
|   | 198 |   |   | .694=72.4° Bé. |
| 5 | 260 | .694=72.4° Bé. | .694=72.4° Bé. | .738=60.2° Bé. |
|   | 310 |   |   | .782=49.4° Bé. |
| 10 | 341 | .782=49.4° Bé. | .738=60.2° Bé. | .807=43.8° Bé. |
|   | 361 |   |   | .831=38.8° Bé. |
| 15 | 381 | .831=38.8° Bé. | .769=52.5° Bé. | .841=36.8° Bé. |
|   | 393 |   |   | .850=35.0° Bé. |
| 20 | 400 | .850=35.0° Bé. | .790=47.6° Bé. | .856=33.8° Bé. |
|   | 407 |   |   | .861=32.8° Bé. |
| 25 | 412 | .861=32.8° Bé. | .803=44.7° Bé. | .866=31.9° Bé. |
|   | 417 |   |   | .871=31.0° Bé. |
| 30 | 422 | .871=31.0° Bé. | .815=42.1° Bé. | .875=30.2° Bé. |
|   | 430 |   |   | .878=29.7° Bé. |
| 35 | 434 | .878=29.7° Bé. | .827=39.6° Bé. | .881=29.1° Bé. |
|   | 437 |   |   | .884=28.6° Bé. |
| 40 | 440 | .884=28.6° Bé. | .831=38.8° Bé. | .886=28.2° Bé. |
|   | 444 |   |   | .888=27.9° Bé. |
| 45 | 448 | .888=27.9° Bé. | .838=37.4° Bé. | .891=27.3° Bé. |
|   | 452 |   |   | .893=26.9° Bé. |
| 50 | 456 | .893=26.9° Bé. | .843=36.4° Bé. | .897=26.2° Bé. |
|   | 458 |   |   | .900=25.7° Bé. |
| 55 | 463 | .900=25.7° Bé. | .848=35.2° Bé. | .902=25.4° Bé. |
|   | 466 |   |   | .904=25.0° Bé. |
| 60 | 470 | .904=25.0° Bé. | .853=34.4° Bé. | .907=24.5° Bé. |
|   | 474 |   |   | .910=24.0° Bé. |
| 65 | 478 | .910=24.0° Bé. | .858=33.4° Bé. | .913=23.5° Bé. |
|   | 482 |   |   | .915=23.1° Bé. |
| 70 | 487 | .915=23.1° Bé. | .862=32.7° Bé. | .918=22.6° Bé. |
|   | 491 |   |   | .921=22.1° Bé. |
| 75 | 497 | .921=22.1° Bé. | .865=32.1° Bé. | .925=21.5° Bé. |
|   | 504 |   |   | .928=21.0° Bé. |
| 80 | 510 | .928=21.0° Bé. | .869=31.3° Bé. | .933=20.1° Bé. |
|   | 520 |   |   | .938=19.3° Bé. |
| 85 | 530 | .938=19.3° Bé. | .873=30.6° Bé. | .943=18.5° Bé. |
|   | 548 |   |   | .948=17.8° Bé. |
| 90 | 568 | .948=17.8° Bé. | .877=29.8° Bé. |   |

Referring to the above table, it will be noted that the gasoline of 434° F. end point having 14% (based on gasoline) over at 260° F. has a gravity of 39.6° Baumé.

It is to be noted that the gasoline or distillate product corresponding to the gasoline distillate range has a gravity of 39.6° whereas the gravity of a product made in precisely the same manner from mid-continent kerosene would have a Baumé gravity of over 54° and, if made from California straight run kerosene, would have a gravity of about 50°. The reason for this very low Baumé gravity is the presence of benzol and related compounds. It is therefore obvious that the treatment of residue dissolved from a California kerosene by sulphur dioxide treatment when subjected to cracking conditions of temperature and pressure will yield a product having pronounced anti-detonating properties and an increased percentage of benzol fractions and related compounds.

The temperatures used in the cracking of the oil range from 600° to 1000° F., while pressures of from 450 to 1500 pounds per square inch have been successfully employed.

Briefly, then, the process involves a method of making motor fuel which consists in subjecting petroleum oil to the solvent action of liquid sulphur dioxide, removing the undissolved hydrocarbons from the sulphur dioxide fractions, distilling the sulphur dioxide from the dissolved fractions and subjecting the residue from the dissolved fractions to cracking temperatures and pressures.

Following is a briefly summarized report of the cracking tests and yields showing in the content of the distillate a large quantity of aromatic compounds having pronounced anti-detonating properties:

*Cracking test.*

Gravity of charging stock, 27.0° A. P. I. Bé.
Color of charging stock, dark red.
Gravity of cracked product, 28.8° A. P. I. Bé.
Recovery of cracked product, 99.5%.

*Yields (based upon raw oil).*

Gasoline (437°), 37.5% by volume 39.6° Bé 437° E. P.
Recharging stock, 52.5% by volume 23.6° Bé.
Fuel oil, 9.0% by volume 12.0° Bé.
Loss (gas and carbon), 1.0% by volume.

*Yields (ultimate—based upon raw oil without coking).*

Gasoline, 70.0% by volume.
Fuel oil, 24.0% by volume.
Loss, 6.0% by volume.

While it has been found that improved results are obtained by effecting the cracking under rather high pressures such as those suggested heretofore, satisfactory results have been obtained by producing the cracking by pressure distillation under relatively lower pressure ranging from 50 to 200 pounds per square inch accompanied by distillation. In other words, while the cracking is preferably produced while the oil is substantially in the liquid phase, commercial yields may be procured by pressure distillation cracking in the liquid vapor phase.

I claim as my invention:

1. A process of making motor fuel having anti-detonating properties, comprising the steps of subjecting petroleum oil to the solvent action of sulphur dioxide, removing the undissolved hydrocarbons from the sulphur dioxide fraction, extracting the sulphur dioxide from the dissolved fraction, subjecting the residue to cracking conditions of temperature and pressure.

2. A process such as that described in claim 1 in which kerosene distillate is treated.

3. A process such as that described in claim 1 in which the sulphur dioxide is extracted from the dissolved fraction by distillation.

4. A process such as that described in claim 1 in which the cracking is effected under a conversion temperature and a pressure sufficient to prevent any substantial vaporization.

5. A process such as that described in claim 1 in which the cracking is effected under a conversion temperature and a pressure in excess of 450 pounds per square inch.

ROY CROSS.